(12) United States Patent
Fang et al.

(10) Patent No.: US 9,106,363 B2
(45) Date of Patent: Aug. 11, 2015

(54) METHOD AND APPARATUS OF MANAGING BANDWIDTH ALLOCATION FOR UPSTREAM TRANSMISSION IN A UNIFIED OPTICAL-COAXIAL NETWORK

(71) Applicant: Futurewei Technologies, Inc., Plano, TX (US)

(72) Inventors: Liming Fang, Cupertino, CA (US); Jim Chen, Corona, CA (US); Li Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 360 days.

(21) Appl. No.: 13/730,272

(22) Filed: Dec. 28, 2012

(65) Prior Publication Data

US 2014/0133859 A1 May 15, 2014

Related U.S. Application Data

(60) Provisional application No. 61/726,966, filed on Nov. 15, 2012.

(51) Int. Cl.
*H04B 10/27* (2013.01)
*H04J 14/08* (2006.01)
*H04Q 11/00* (2006.01)

(52) U.S. Cl.
CPC .............. *H04J 14/086* (2013.01); *H04B 10/27* (2013.01); *H04Q 11/0067* (2013.01); *H04Q 11/0071* (2013.01); *H04Q 2011/0077* (2013.01)

(58) Field of Classification Search
None
See application file for complete search history.

(56) References Cited

U.S. PATENT DOCUMENTS

| 2007/0019957 | A1  | 1/2007 | Kim et al. |
| 2009/0011705 | A1  | 1/2009 | Taori et al. |
| 2013/0239165 | A1* | 9/2013 | Garavaglia et al. ........... 725/129 |
| 2014/0079399 | A1* | 3/2014 | Goswami et al. ............... 398/76 |

FOREIGN PATENT DOCUMENTS

| CN | 1614944 A   | 5/2005 |
| CN | 101166154 A | 4/2008 |

(Continued)

OTHER PUBLICATIONS

"Broadcom Introduces DOCSIS—Based EoC for EPON Product Portfolio in Support of China's Network Convergence," Press Release; http://www.broadcom.com/press/release.php?id-s523445, Oct. 27, 2010, 2 pages.

(Continued)

*Primary Examiner* — Jae Y Lee
*Assistant Examiner* — Alan Lindenbaum
(74) *Attorney, Agent, or Firm* — Conley Rose, P.C.; Grant Rodolph; Jonathan K. Polk

(57) ABSTRACT

A method of allocating upstream bandwidth on a network comprising mapping an integer portion of a value obtained from a grant start time into a symbol number of a data frame on a coaxial segment of the network, wherein the value comprises the grant start time in units of a length of a data frame in the coaxial segment of a network, and wherein the length of the data frame comprises a preselected number of units of time defined in an optical segment of a network; mapping a fractional portion of the value obtained from the grant start time into a subcarrier number of the data frame; and mapping a grant length into a number subcarriers of the data frame.

20 Claims, 12 Drawing Sheets

(56) References Cited

FOREIGN PATENT DOCUMENTS

| CN | 101796745 A | 8/2010 |
|---|---|---|
| WO | 2011031831 A1 | 3/2011 |

OTHER PUBLICATIONS

"Operating the EPON Protocol Over Coaxial Distribution Networks Call for Interest," IEEE 802.3 Ethernet Working Group, Nov. 8, 2011, Atlanta, Georgia, 38 pages.

Foreign Communication From A Counterpart Application, PCT Application No. PCT/CN2013/087213, International Search Report dated Feb. 27, 2014, 6 pages.

Foreign Communication From A Counterpart Application, PCT Application No. PCT/CN2013/087213, Written Opinion dated Feb. 27, 2014, 3 pages.

Chen, J., "A Example of Designing a Coax Convergence Layer in EPoC," XP-002713588, Jul. 17, 2012, 9 pages.

"DOCSIS EoC for EPON in China," published in Chinese Aug. 30, 2010, 15 pages and published in English Nov. 1, 2012, 14 pages.

"HomePNA Modem for MDU Endpoints," CG3310M, Sigma Designs, May 21, 2012, 2 pages.

Stascheit, B., "The Use of Ethernet-Over-Coax in HFC Networks," Scientific Atlanta, A Cisco Company, Transmission Technologies, Dec. 2007, 5 pages.

\* cited by examiner

METHOD AND APPARATUS OF MANAGING BANDWIDTH ALLOCATION FOR UPSTREAM TRANSMISSION IN A UNIFIED OPTICAL-COAXIAL NETWORK

CROSS-REFERENCE TO RELATED APPLICATIONS

The present application claims the benefit of U.S. Provisional Patent Application No. 61/726,966 filed Nov. 15, 2012 by Liming Fang, et al. and entitled "Method and Apparatus of Managing Bandwidth Allocation for Upstream Transmission in a Unified Optical-Coaxial Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. Ethernet passive optical network (EPON) is a PON standard developed by the Institute of Electrical and Electronics Engineers (IEEE) and specified in IEEE 802.3ah, which is incorporated herein by reference as if reproduced in its entirety. In EPON, single fiber can be used for both the upstream and the downstream transmission with different wavelengths. The OLT implements an EPON Media Access Control (MAC) layer for transmission of Ethernet Frames. The Multi-Point Control Protocol (MPCP) performs the bandwidth assignment, bandwidth polling, auto-discovery, and ranging. Ethernet frames are broadcast downstream based on the Logical Link Identifier (LLID) embedded in the preamble frame. Upstream bandwidth is assigned based on the exchange of Gate and Report messages between an OLT and an ONU.

Ethernet over Coax (EoC) is a generic name used to describe all technologies which can be used for transmission of Ethernet frames over a unified optical-coaxial (coax) network. The name comes from the fact that, except for Data Over Cable Service Interface Specification (DOCSIS), all these technologies have in common that the Ethernet Frames are transmitted in the MAC layer.

Different EoC technologies exist including Multimedia over Coax Alliance (MoCA), G.hn (a common name for a home network technology family of standards developed under the International Telecommunication Union's Standardization arm (ITU) and promoted by the HomeGrid Forum), HomePNA Alliance (HPNA), and Home Plug Audio/Visual (A/V) used, as and they have been configured to run the outdoor coax access from an ONU to an EoC Head End with connected Customer Premises Equipment (CPEs) located in the subscriber homes.

There is a rising demand which requires the use of EPON as an access system to interconnect with multiple coax cables to terminate the Coax Network Units (CNUs) located in the subscriber's home with an Ethernet PON over Coax (EPoC) architecture. However, none of the above-referenced EoC technologies provides an end-to-end optical to coax scheduling mechanism for transferring upstream data from connected CNUs on a coaxial segment of the unified optical-coaxial network to the OLT and OLT-connected fiber network. Consequently, there is a need in the art for methods and systems to provide a mechanism for end-to-end resource scheduling across a unified optical-coaxial network, e.g. an EPoC network, where resource allocation in each domain may have a different structure depending on the physical layer architecture in the respective network segments.

SUMMARY

In an embodiment the disclosure includes a CNU comprising a processor configured to extract a grant start time from a message allocating a time window for upstream transmission of data, extract grant length from the message allocating the time window for upstream transmission of data, map an integer portion of a value obtained from the grant start time into a symbol number of a data frame, wherein the value comprises the grant start time in units of a length of a data frame in a coaxial segment of a network, and wherein the length of the data frame comprises a preselected number of units of time defined in an optical segment of a network, map a fractional portion of the value obtained from the grant start time into a subcarrier number of the data frame, and map the grant length into a number of subcarriers of the data frame.

In another embodiment, the disclosure includes an OLT comprising a processor configured to allocate a time window to a CNU, the time window comprising a grant start time and a grant start length and wherein the grant start time and grant start length comprise a number of quanta of time in an optical segment of a network, map an integer portion of a value obtained from the grant start time into a symbol number of a data frame in a coaxial segment of the network, wherein the value comprises the grant start time in units of a length of a data frame in the coaxial segment of a network and wherein the length of the data frame comprises a preselected number of quanta of time in the optical segment of a network, map a fractional portion of the value obtained from the grant start time into a physical resource block (PRB) number of the data frame, and map the grant length into a number of PRBs of the data frame.

In yet another embodiment, the disclosure includes a method of allocating upstream bandwidth on a network comprising mapping an integer portion of a value obtained from a grant start time into a symbol number of a data frame on a coaxial segment of the network wherein the value comprises the grant start time in units of a length of a data frame in the coaxial segment of a network and wherein the length of the data frame comprises a preselected number of units of time defined in an optical segment of a network, mapping a fractional portion of the value obtained from the grant start time into a subcarrier number of the data frame, and mapping a grant length into a number subcarriers of the data frame.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses to support the unified optical-coaxial network architecture and address the aforementioned need. In one embodiment, this disclosure maps resources in a coaxial network based on the time window allocated in the optical domain. In another embodiment, an OLT is provided including a processor configured to allocate a transmission time window to resources in the coaxial domain and transmit the mapped resources to a CNU. In yet another embodiment, a CNU is provided including a processor configured to map a transmission time window in the upstream segment, e.g. an optical segment, to network channel resources in the downstream, e.g. coaxial, segment.

Figure 1:
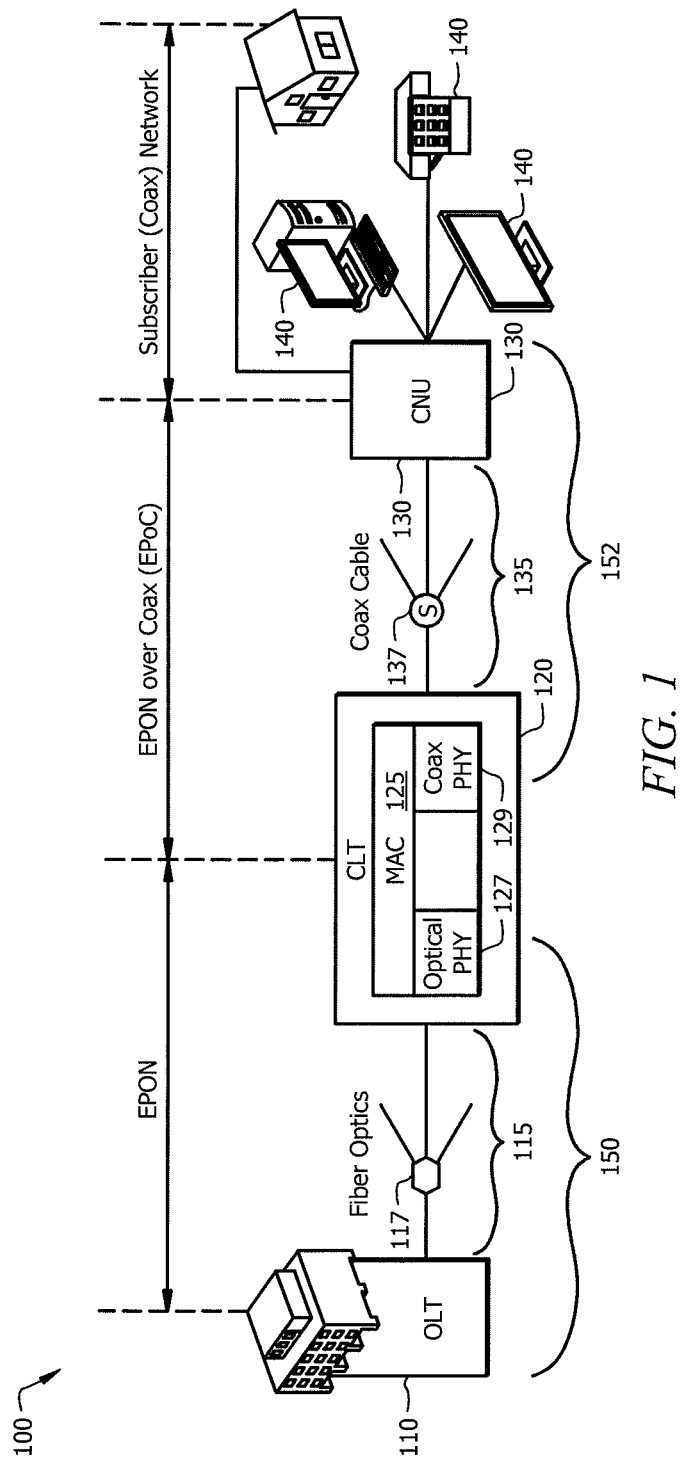
FIG. 1 is a diagram of a unified optical-coaxial network according to an embodiment of the disclosure.

Refer now to FIG. 1, which illustrates an embodiment of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140 and a coaxial line terminal (CLT) 120 positioned between OLT 110 and CNU 130, e.g. between the optical portion 150 and the electrical portion 152. The OLT 110 may be coupled via an Optical Distribution Network (ODN) 115 to one or more CLTs 120, and optionally to one or more ONUs (not shown), in the optical portion 150. The ODN 115 may comprise fiber optics and an optical splitter 117 that couples OLT 110 to the CLT 120 and any ONUs. The CLT 120 may be coupled to the CNUs 130 via an electrical distribution network (EDN) 135, which may comprise a cable splitter 137. Although FIG. 1 shows one CLT 120 and one CNU 130, the unified optical-coaxial network 100 may comprise any number of CLTs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that it may be a communications network that does not require any active components to distribute data between the OLT 110 and the CLT 120. Instead, the optical portion 150 may use the passive optical components in the ODN 115 to distribute data between the OLT 110 and the CLT 120. Examples of suitable protocols that may be implemented in the optical portion 150 include the asynchronous transfer mode PON (APON) and the broadband PON (BPON) defined by the ITU Telecommunication Standardization Sector (ITU-T) G.983 standard, Gigabit PON (GPON) defined by the ITU-T G.984 standard, the EPON defined by the IEEE 802.3ah standard, and the wavelength division multiplexing (WDM) PON (WDM-PON), all of which are incorporated by reference as if reproduced in their entirety.

The OLT 110 may be any device configured to communicate with the CNUs 130 via the CLT 120. The OLT 110 may act as an intermediary between the CLTs 120 or CNUs 130 and another network (not shown). The OLT 110 may forward data received from the other network to the CLTs 120 or CNUs 130 and forward data received from the CLTs 120 or CNUs 130 onto the other network. Although the specific configuration of the OLT 110 may vary depending on the type of optical protocol implemented in the optical portion 150, in an embodiment, OLT 110 may comprise an optical transmitter and an optical receiver. When the other network is using a network protocol that is different from the protocol used in the optical portion 150, OLT 110 may comprise a converter that converts the other network protocol into the optical portion 150 protocol. The OLT converter may also convert the optical portion 150 protocol into the other network protocol.

The ODN 115 may be a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the CLT 120. It should be noted that the optical fiber cables may be replaced by any optical transmission media in some embodiments. In some embodiments, the ODN 115 may comprise one or more optical amplifiers. The ODN 115 typically extends from the OLT 110 to the CLT 120 and any optional ONUs (not shown) in a branching configuration as shown in FIG. 1, but may be alternatively configured as determined by a person of ordinary skill in the art.

The CLT 120 may be any device or component configured to forward downstream data from the OLT 110 to the corresponding CNUs 130 and forward upstream data from the CNUs 130 to the OLT 110. The CLT 120 may convert the downstream and upstream data appropriately to transfer the data between the optical portion 150 and the electrical portion 152. (Although terms "upstream" and "downstream" may be used throughout to denote the locations of various network features relative to the OLT, or similar unit, those skilled in the art will appreciate that the data flow on the network in the embodiments of the disclosure is bi-directional.) The data transferred over the ODN 115 may be transmitted or received in the form of optical signals, and the data transferred over the EDN 135 may be transmitted or received in the form of electrical signals that may have the same or different logical structure as compared with the optical signals. As such, the CLT 120 may encapsulate or frame the data in the optical portion 150 and the electrical portion 152 differently. In an embodiment, the CLT 120 includes a media access control (MAC) layer 125 and physical layers (PHY), corresponding to the type of signals carried over the respective media. The MAC layer 125 may provide addressing and channel access control services to the physical layers. As such, the PHY may comprise optical PHY 127 and a coaxial PHY 129. In many embodiments, the CLT 120 is transparent to the CNU 130 and OLT 110 in that the frames sent from the OLT 110 to the CNU 130 may be directly addressed to the CNU 130 (e.g. in the destination address), and vice-versa. As such, the CLT 120 intermediates between network portions, namely an optical portion 150 and a coax portion 152 in the example of FIG. 1.

The electrical portion 152 of the unified electrical and coaxial network 100 may be similar to any known electrical communication system. The electrical portion 152 may not require any active components to distribute data between the CLT 120 and the CNU 130. Instead, the electrical portion 152 may use the passive electrical components in the electrical portion 152 to distribute data between the CLT 120 and the CNUs 130. Alternatively, the electrical portion 152 could use some active components, such as amplifiers. Examples of suitable protocols that may be implemented in the electrical portion 152 include MoCA, G.hn, HPNA, and Home Plug A/V, all of which are incorporated by reference as if reproduced in their entirety.

The EDN 135 may be a data distribution system that may comprise electrical cables (e.g. coaxial cable, twisted wires, etc.), couplers, splitters, distributors, and/or other equipment. In an embodiment, the electrical cables, couplers, splitters, distributors, and/or other equipment are passive electrical components. Specifically, the electrical cables, couplers, splitters, distributors, and/or other equipment may be components that do not require any power to distribute data signals between the CLT 120 and the CNU 130. It should be noted that the electrical cables may be replaced by any electrical transmission media in some embodiments. In some embodiments, the EDN 135 may comprise one or more electrical amplifiers. The EDN 135 typically extends from the CLT 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, electrically the CLT 120 and any subscriber devices 140. Specifically, the CNUs 130 may act as an intermediary between the OLT 110 and the subscriber devices 140. For instance, the CNUs 130 may forward data received from the OLT 110 to the subscriber devices 140, and forward data received from the subscriber devices 140 onto the OLT 110. Although the specific configuration of the CNUs 130 may vary depending on the type of unified optical-coaxial network 100, in an embodiment the CNUs 130 may comprise an electrical transmitter configured to send electrical signals to the CLT 120 and an electrical receiver configured to receive electrical signals from the CLT 120. Additionally, the CNUs 130 may comprise a converter that converts the electrical signal into electrical signals for the subscriber devices 140, such as signals in the asynchronous transfer mode (ATM) protocol, and a second transmitter and/or receiver that may send and/or receive the electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscriber devices 140 may include desktop computers, laptop computers, tablets, mobile telephones, residential gateways, televisions, set-top boxes, and similar devices.

Figure 2:
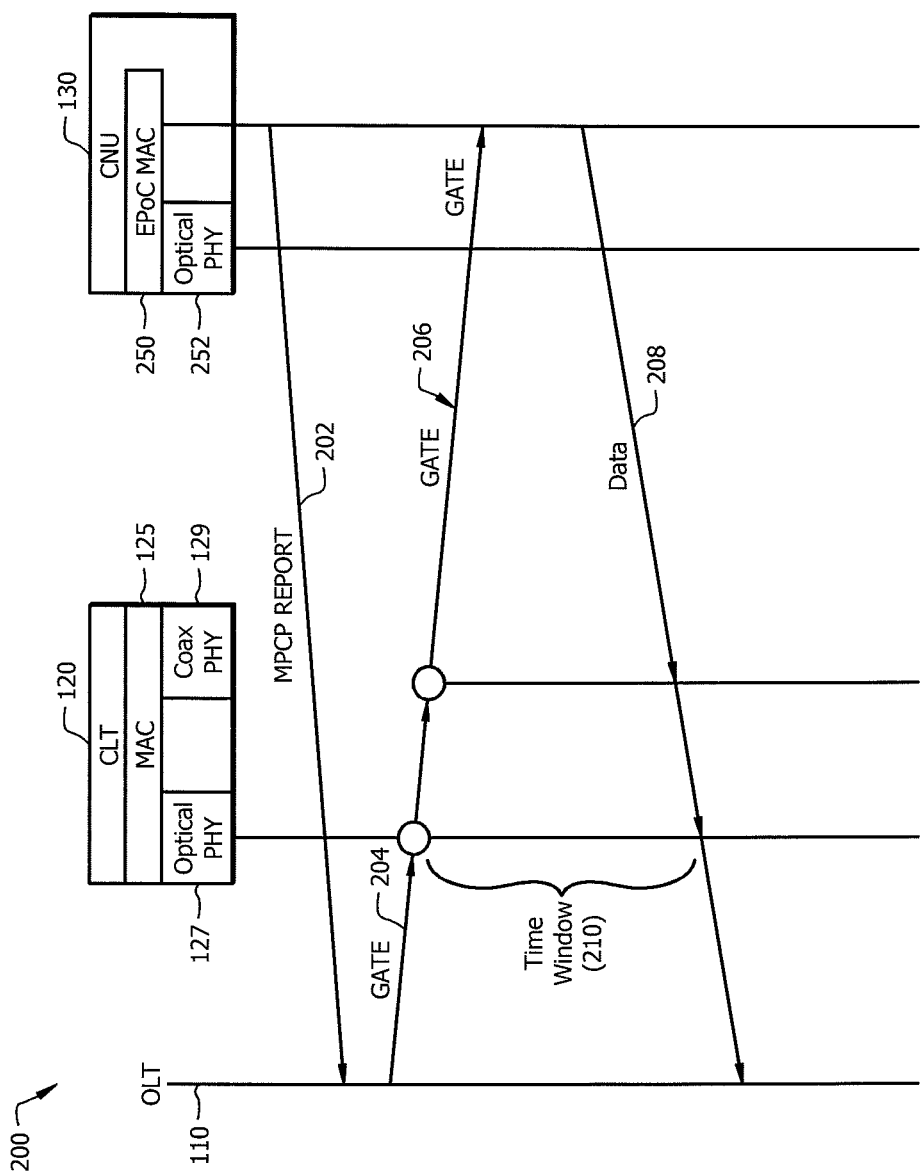
FIG. 2 is a protocol diagram in accordance with an embodiment of the disclosure.

Refer now to FIG. 2, which illustrates a message protocol in accordance with an embodiment of the disclosure. Message protocol 200 will be described in the context of the unified optical-coaxial network 100 shown in FIG. 1; however, it will be understood by those skilled in the art that the principles set forth herein are not limited to the embodiment of FIG. 1. A CNU 130 having queued data for transmission upstream may request the allocation of a timeslot for sending the data by an MPCP REPORT message 202 to the OLT 110 in accordance with the embodiment of FIG. 1. The OLT 110 may respond with a GATE message (GATE) 204. GATE 204 may include a timeslot or window that may be used by the requesting CNU 130 for the upstream transmission of its queued data. In allocating the timeslot, the OLT 110 may incorporate therein a delay, which may be referred to as a polling delay. The polling delay may be determined to accommodate delays in the coaxial portion 152 of the unified optical-coaxial network.

GATE 204 may be forwarded to the requesting CNU 130 by the CLT 120 intermediating the transfer of data between the optical portion 150 and coaxial portion 152. CLT 120 may forward the timeslot to the requesting CNU 130 via GATE 206. As will be described further below, GATE 204 may carry information to the requesting network unit, e.g. a CNU 130, which maps the allocated timeslot into resources as defined in the physical layer of the downstream network segment, coax portion 152 in FIG. 1. Forwarded GATE message 206 informs MAC 250 in CNU 130 as to the amount of data (e.g. number of bytes) the CNU 130 may send in the allocated time window. For example, the allocated timeslot may map into an OFDM symbol, as described further below. Coax PHY 252 in the CNU 130 may load the upstream OFDM frame. Data 208 depicts the end-to-end (e.g. from a CNU 130 to OLT 110 on a unified optical-coaxial network). The CLT 120 (or similar transit node) may intermediate the upstream transmission by forwarding the data when time window 210 opens.

Figure 3:
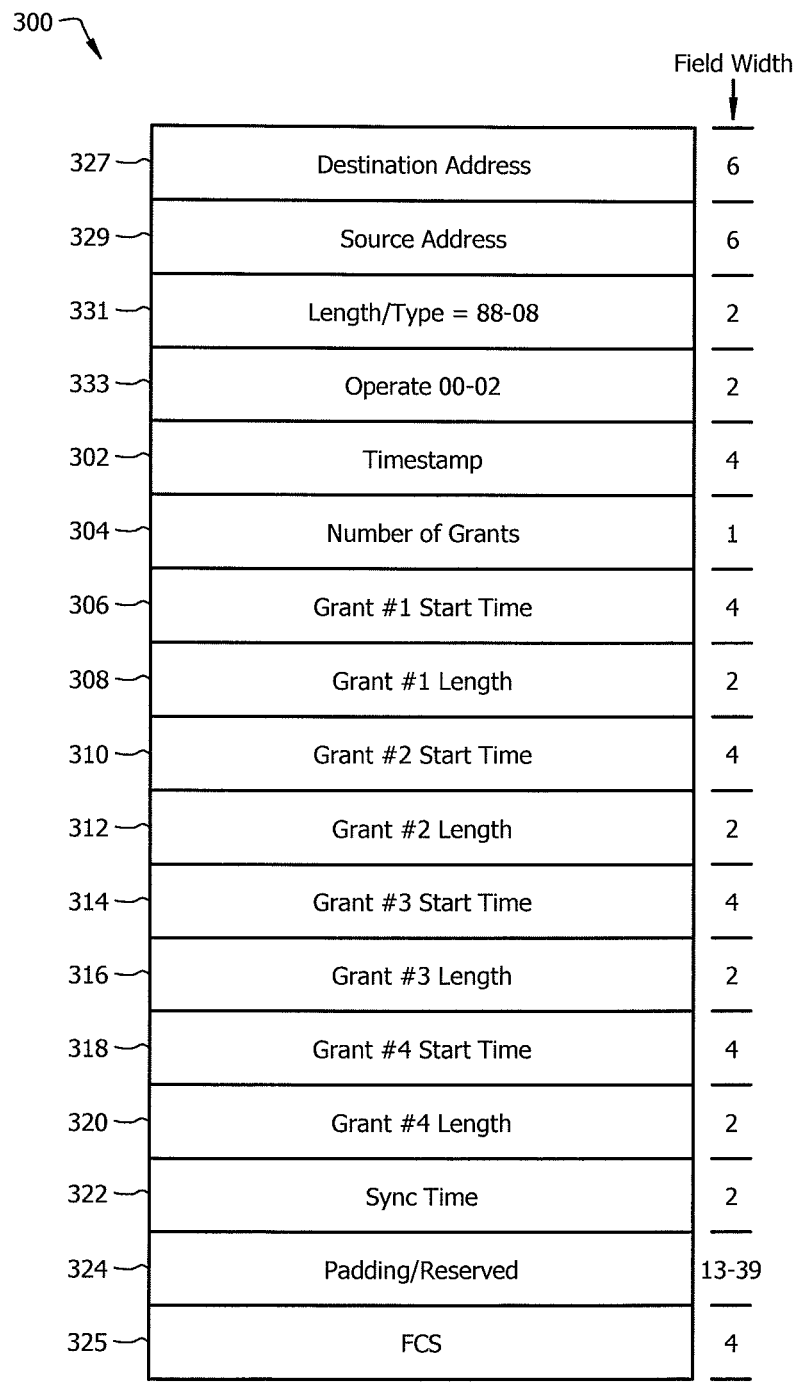
FIG. 3 is a schematic diagram of a portion of an Ethernet frame in accordance with an embodiment of the disclosure.

Refer now to FIG. 3, which illustrates a schematic drawing of a portion of an Ethernet frame 300 comprising an MPCP GATE message in accordance with an embodiment of the disclosure. Ethernet frame portion 300 includes a plurality of fields and each field may be comprised of one or more bytes of data. The width of the respective fields in bytes is shown in FIG. 3 in the column labeled field width. Frame portion 300 may include a four-byte timestamp 302 and a number of grants allocated in the GATE message 304 (four in this illustrative embodiment). Fields 306 and 308 may define the first grant (Grant #1) window: a two byte grant #1 length 306 and a four byte grant #1 start time 308. Similarly, fields 310 and 312, fields 314 and 316, and fields 318 and 320 may define the grant windows for Grant #2, Grant #3, and Grant #4, respectively. Additionally, frame portion 300 may include a sync time 322 which may be used by a head end, such as an OLT 110, to communicate to a network unit the amount of time the OLT needs to synchronize its receivers, and is not described further in the present disclosure. Field 324 may comprise padding and/or reserved bits; the width of field 324 may span from 13 to 39 bytes. As described further below in conjunction with FIG. 10, in an embodiment of the disclosure field 324 may be used to carry channel profile data with respect to the coaxial portion of a unified optical-coaxial network. Additional fields in frame 300 depicted in FIG. 3 include a 4-byte Frame Check Sequence (FCS) 325, a 6-byte destination MAC address 327, a 6-byte source MAC address 329, a 2-byte Ethertype/length 331 and an opcode 333, all of which are known in the art.

Figure 4:
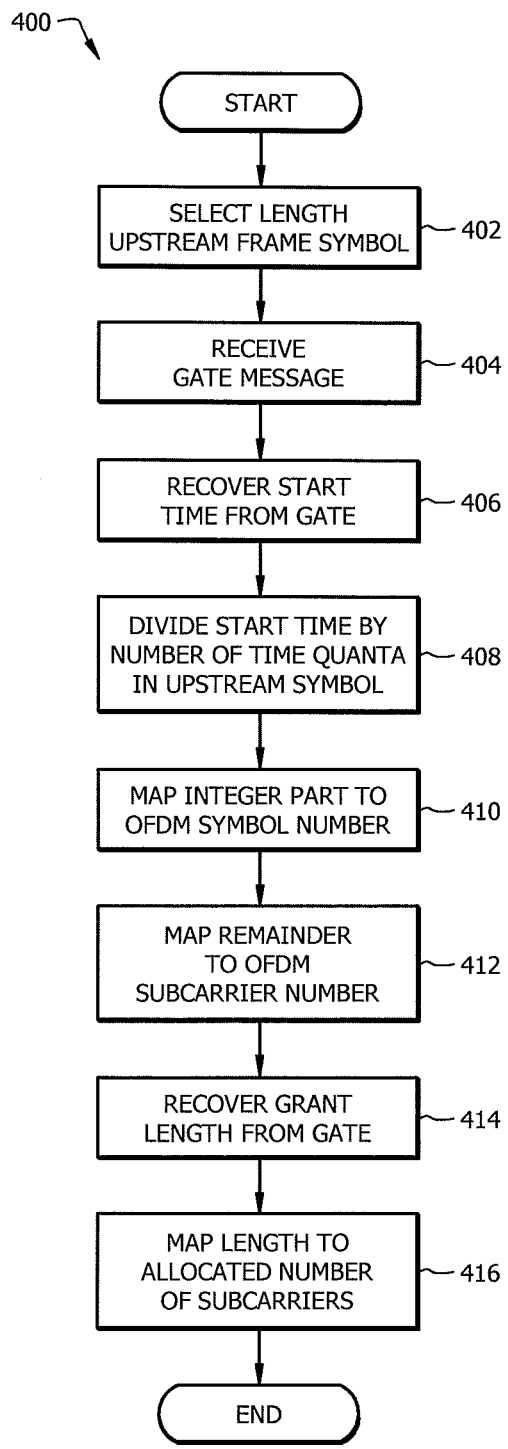
FIG. 4 is a flowchart of a process for allocating upstream bandwidth in a network in accordance with an embodiment of the disclosure.

Refer now to FIG. 4, which illustrates a flowchart of a process 400 for allocating upstream bandwidth in a network. In particular, the embodiment illustrated in FIG. 4 is directed to the allocation of network resources in the downstream network portion, e.g. coax portion 152 in FIG. 1. In an embodiment in accordance with unified optical-coaxial network 100 in FIG. 1, process 400 may be implemented by a CNU 130. Alternatively, process 400 may be configured for implementation by an OLT 110 as discussed further below. Process 400 may be described in the context of a unified optical-coaxial network 100 in FIG. 1, to illustrate the principles of the disclosure. However, it will be recognized that the principles illustrated thereby are not limited to the illustrative embodiment.

In step 402, a symbol length on the downstream network segment may be selected in units of time (e.g. time quanta) defined on the upstream network segment. That is, a symbol length on the downstream segment (e.g. coax portion 152 in FIG. 1) is selected to be an integer multiple of the unit or quantum of time defined on the upstream segment (e.g. optical portion 150 in FIG. 1). Step 402 may be performed in conjunction with an initialization of the communication channel. In step 404, an MPCP GATE message may be received and in step 406, the start time of a window embedded in the GATE message may be recovered. The start time may carried for example, in one of fields 306, 310, 314 or 318 in an embodiment of a portion of a GATE message illustrated in FIG. 3.

The start time us obtained from the GATE message may be used to allocate resources on the coax network segment. In step 408, the start time recovered in step 406 may be divided by the number of optical domain time quanta (OTQ) comprising a symbol on the downstream network segment as selected in step 402, which may be an OFDM symbol. In other words, the symbol length in OTQ may be understood to be the unit of measure to apportion the grant window into time blocks defined in the downstream coaxial segment of, e.g. unified optical-coaxial network 100 in FIG. 1.

In step 410, the integer part of the result from step 408 may be mapped to an OFDM symbol number. The remainder (or fractional part) of the result may be mapped to an OFDM subcarrier number in step 412. In this way, the receiving CNU 130 may be allocated an OFDM symbol and the first subcarrier of a block of subcarriers that the receiving CNU 130 may use for the upstream transport of its queued data.

Continuing to step 414, a grant length may be recovered from the GATE message. The grant length may be carried for example in an embodiment of a portion of a GATE message illustrated in FIG. 3 in the one of fields 308, 312, 316 or 320 corresponding to the field 306, 310, 314 or 318 from which the start time was obtained in step 406. In step 416, the grant length may be mapped to a number of OFDM subcarriers. In the GATE portion 300 in FIG. 3, the grant length may comprise a 16-bit value. Thus, in an embodiment of an OFDM symbol having 1,024 subcarriers, the first 10 bits of the grant length may be used to allocate a block of subcarriers, beginning with the subcarrier number obtained in step 412. Note that in an embodiment in which subcarriers are allocated in blocks, e.g. physical resource blocks (PRB) as described further below, the subcarrier allocations in steps 414 and 416 may be further aligned with the PRB structure of the message frame in the downstream portion, e.g. coax portion 152 in FIG. 1.

Figure 5:
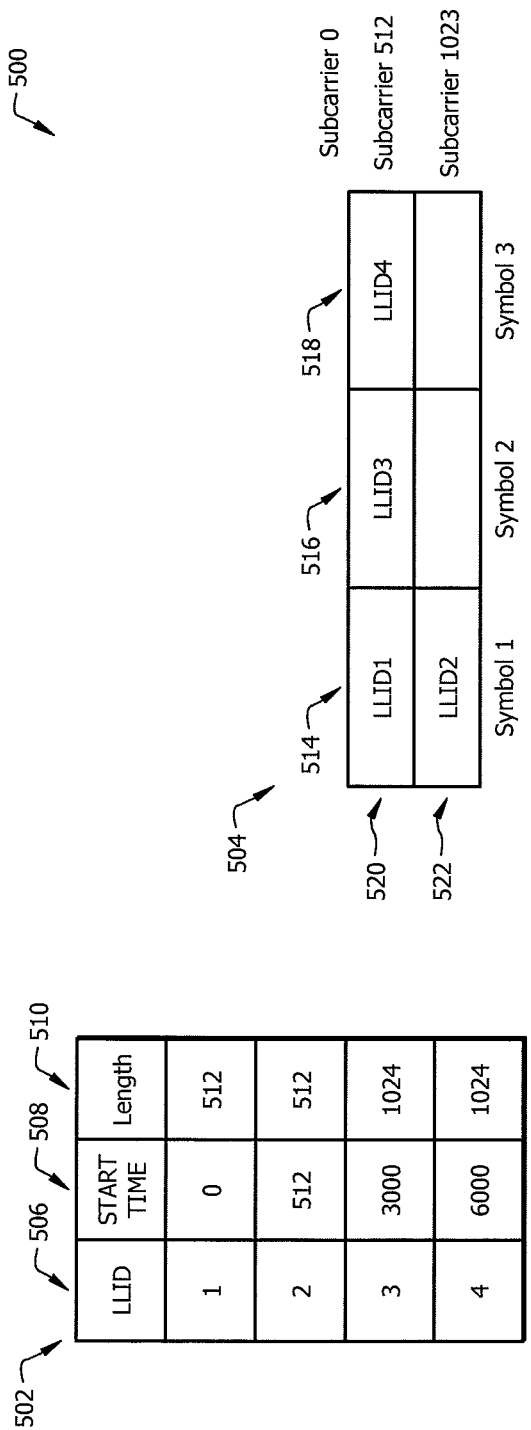
FIG. 5 is a schematic diagram of a resource allocation map in accordance with an embodiment of the disclosure.

To further understand resource allocation process 400, refer now to FIG. 5 which illustrates an example allocation map 500 in accordance with the principles of the disclosure. Hereinafter, map 500 may be described in the context of a unified optical-coaxial network 100 in FIG. 1 to illustrate the principles of the disclosure. However, it will be recognized that the principles illustrated thereby are not limited to the embodiment. In FIG. 5, a symbol length, such as OFDM symbol length, is selected to be 3,000 units of OTQ, and the number of OFDM subcarriers in a frame is taken to be 1,024 for purposes of illustration. However, it would be understood by those skilled in the art that the principles illustrated by this example are not restricted to these values.

Table 502 illustrates example grant start times and lengths for four CNUs which may be identified as LLID1-LLID4 as shown in column 506. The respective grant start times are shown in column 508 of table 502, and respective grant lengths in column 510. Thus, in table 502, LLID1 may receive a grant start time of 0 and a grant length of 512 OTQ. Similarly, LLID2 may receive a grant start time of 512 OTQ and a grant length of 512 OTQ, LLID3 a grant start time of 3000 OTQ and length 1024 OTQ, and LLID4 a grant start time of 6000 OTQ and length of 1024 OTQ.

Symbol allocation table 504 reflects the mapping of the grants in table 502. As the start times of both LLID1 and LLID2 are less than 3,000, the example symbol length in OTQ, each of these are allocated to a single symbol of the frame, here the first symbol 514, labeled Symbol 1. Further each have a length of 512 OTQ which is less than the example number of subcarriers in the frame, so the subcarriers in Symbol 1 are shared between LLID1 and LLID2. LLID1 may be allocated the block of subcarriers 520 (subcarriers numbered 0-511) and LLID2 may be allocated block 522 (subcarriers numbered 512-1023). The grant start of LLID3 is 3000, so it may at least share the next symbol 516, labeled Symbol 2. LLID4 has a grant start time of 6000, so it may be allocated to the third symbol 518, labeled Symbol 3 in table 504. Thus, in this example, LLID2 does not share Symbol 2. With respect to the subcarriers in Symbols 1 and 2, because both LLID3 and LLID4 have grant lengths of 1024 OTQ, each may be allocated all 1024 subcarriers in their respective symbols.

Figure 6:
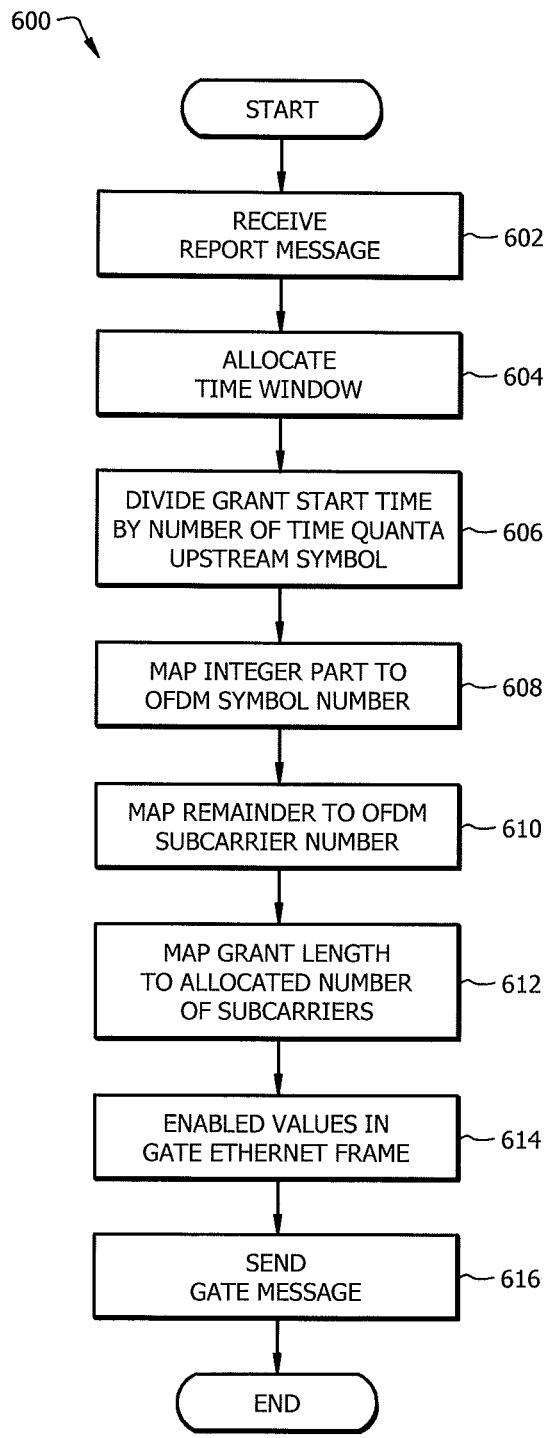
FIG. 6 is a flowchart of a process for allocating upstream bandwidth in a network in accordance with another embodiment of the disclosure.

As previously stated, the resource allocation process 400 in FIG. 4 may be configured whereby the resource allocation on the downstream network segment (coax portion 152 in FIG. 1) may be allocated by the OLT 110 in FIG. 1. Process 600 in FIG. 6 is an embodiment of the disclosure which may be used by an OLT to allocate resources on the downstream segment. Hereinafter, process 600 may be described in the context of a unified optical-coaxial network 100 in FIG. 1 to illustrate the principles of the disclosure. However, it will be recognized by those skilled in the art that the principles illustrated thereby are not limited to the illustrative embodiment.

In step 602, a MPCP REPORT message may be received. As described in conjunction with FIG. 2, a REPORT message may convey a request for an allocation of upstream bandwidth from a CNU 130 having queued data. In response to the REPORT message received in step 602, an OLT may allocate a time window in step 604. As described in conjunction with FIG. 3, a time window may comprise a grant start time and a grant length, each expressed as an integer number of OTQ.

The time window allocated in step 604 may subsequently be transmitted to the requesting CNU 130.

In step 606, the start time allocated in step 604 may be divided by the number of optical OTQ comprising an OFDM symbol. Recall that the length of an OFDM symbol may be selected when the downstream network segment, e.g. the coaxial segment, is initialized. In step 608, the integer part of the result from step 606 may be mapped to an OFDM symbol number. The remainder (or fractional part) of the result may be mapped to an OFDM subcarrier number in step 610. In this way, the receiving CNU 130 may be allocated an OFDM symbol and the first subcarrier of a block of subcarriers that the receiving CNU 130 may use for the upstream transport of its queued data.

In step 612, the grant length may be mapped to a number of OFDM subcarriers. The mapping has been described in conjunction with step 416. Note that in an embodiment in which subcarriers are allocated in PRB as described further below, the subcarrier allocations in steps 608 and 610 may be further aligned with the PRB structure of the message frame in the downstream segment, e.g. coaxial portion 152 in FIG. 1. In step 614, the values obtained in steps, 608, 610, and 612 may be embedded in an MPCP GATE message. For example, the values may be embedded in a portion of a preamble field of the GATE message. An example embodiment of a GATE message formatted in this way will be described in conjunction with FIG. 7 below. In step 616, the GATE message may be transmitted to the CNU 130 requesting the upstream bandwidth.

Figure 7:
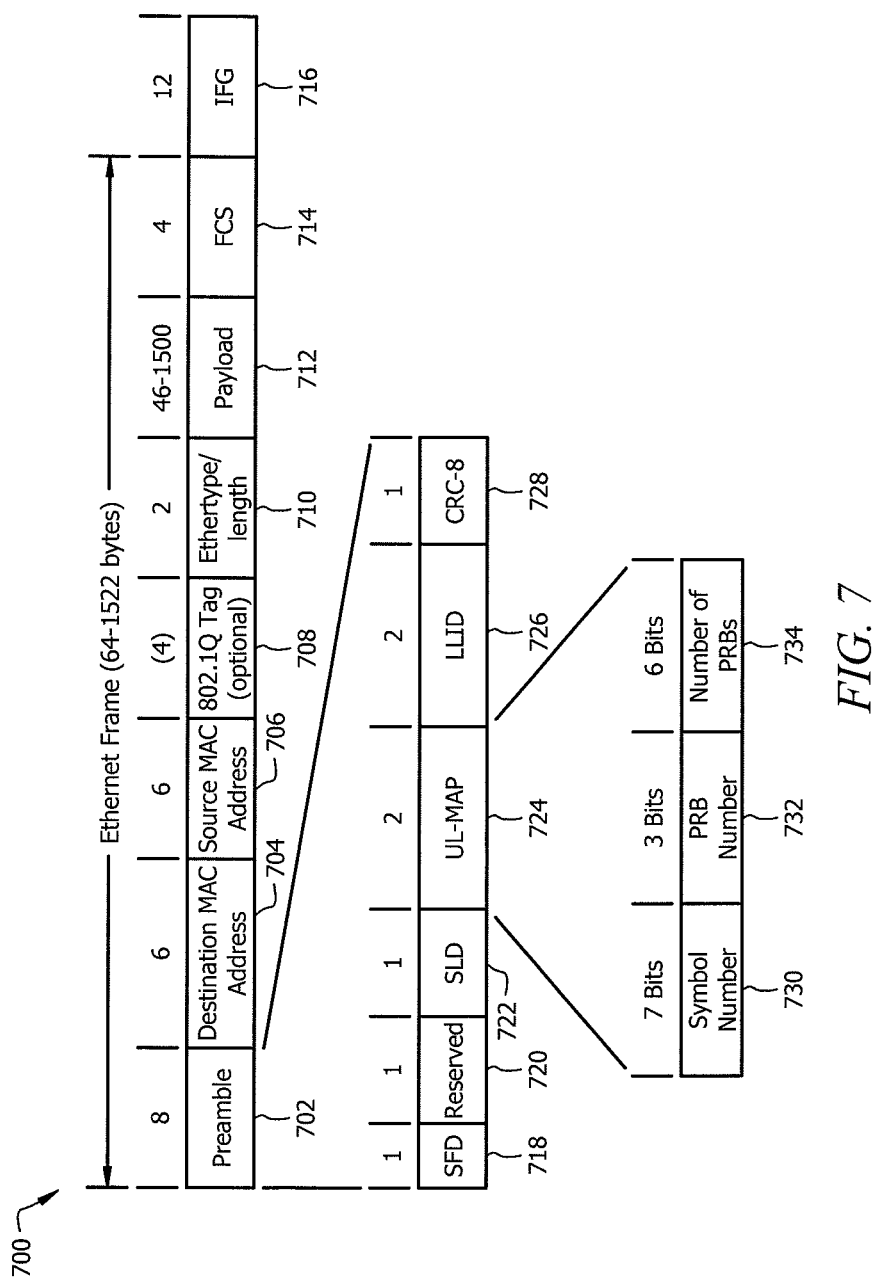
FIG. 7 is a schematic diagram of an Ethernet frame in accordance with an embodiment of the disclosure.

Refer now to FIG. 7, which illustrates an Ethernet frame 700 that may be used to carry a GATE message in accordance with an embodiment of the disclosure. Frame 700 begins with an 8-byte preamble 702. The remaining fields, a 6-byte destination MAC address 704, a 6-byte source MAC addresses 706, an optional 4-byte 802.1Q Tag 708, a 2-byte Ethertype/length 710, a 46-155 byte payload 712, and a 4-byte frame check sequence (FCS) 714, all of which are well known in the art. An inter-frame gap (IFG) 716 may be 12-bytes in length and may be positioned between successive Ethernet frames.

In accordance with one embodiment of the disclosure, preamble 702 may be further understood by referring to the "exploded" views in FIG. 7. The exploded view of preamble 702 depicts six fields: field 718 may be a start-of-frame delimiter (SFD); field 720 may comprise a reserved byte; field 722 may comprise a one-byte start-of-LLID delimiter (SLD); field 724 may comprise a UL-MAP (described further in conjunction with another exploded view in FIG. 7; field 726 may comprise a two-byte LLID; and field 728 may comprise a one byte cyclical redundancy check (CRC-8).

An "exploded" view of UL-MAP 724 illustrates, in accordance with an embodiment of the disclosure, a 7-bit field 730 which may comprise an OFDM symbol number and field 732 may comprise a 3-bit PRB number. An OFDM frame PRB comprises a block of OFDM subcarriers, and may represent the smallest number of OFDM subcarriers that may be allocated to a device. As described in conjunction with steps 608 and 610 in FIG. 6, the subcarrier number and block of subcarriers may be aligned with the PRB structure of a message frame. Thus, PRB field 732 may represent the first PRB allocated in a grant that spans a plurality of PRBs, wherein the PRB number is aligned to the subcarrier number mapped in step 608. The number of PRBs containing the number of subcarriers mapped in step 610 in FIG. 6 (as aligned to the PRB structure) may be embedded in field 734 of UL-MAP 724. Field 734 comprises, in the example illustrated, a 6-bit field.

The order of the fields is illustrative of an Ethernet frame in accordance with IEEE 802.3. However, the principles of the disclosure are not limited to a particular frame architecture and other predetermined message formats may be used therewith. Likewise, the respective lengths of the fields are similarly illustrative, and other predetermined field lengths in accordance with other message formats may be used in alternative embodiments, and such embodiments would lie within the spirit and scope of the claimed inventions.

Figure 8:
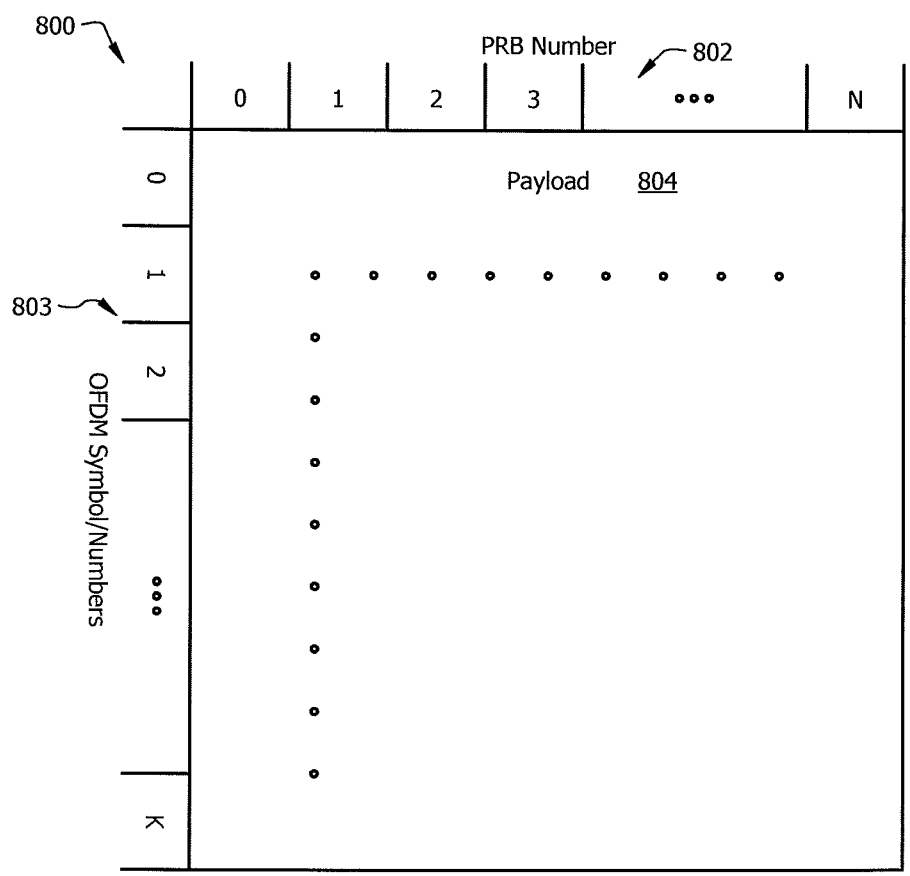
FIG. 8 is a schematic drawing of an orthogonal frequency division multiplex (OFDM) frame that may be used in conjunction with the processes for allocating upstream bandwidth in a network in accordance with embodiments of the disclosure.

To further understand UL-MAP field 724, an example OFDM frame 800 is illustrated in FIG. 8. Frame 800 may comprise a plurality of OFDM PRB 802. Each PRB represents a corresponding group of OFDM subcarriers. Illustrated in frame 800 are N+1 PRBs, numbered 0, 1, . . . , N. While it would be understood by those skilled in the art that, in principle, N could be any finite integer, representative values may be N=15 in an embodiment of a unified optical-coaxial network having 24 MHz channels and may be N=79 in an embodiment having 120 MHz channels. Frame 800 also includes a plurality of OFDM symbols 803. A payload 804 carried in the OFDM frame may comprise the data carried in the OFDM frame. In the illustrative example of FIG. 8, there are K+1 symbols, numbered 0, 1, . . . , K. Again, while K could be any finite integer, a representative value may be K=74 in an OFDM frame in a unified optical-coaxial network 100 in FIG. 1. Thus, referring to FIG. 7, a value representing a plurality of the N PRBs illustrated in frame 800 may be embedded in field 734. A PRB number, one of the values 0, . . . , N, in frame 800 corresponding to the first PRB of the plurality may be embedded in field 732 in FIG. 7.

Figure 9:
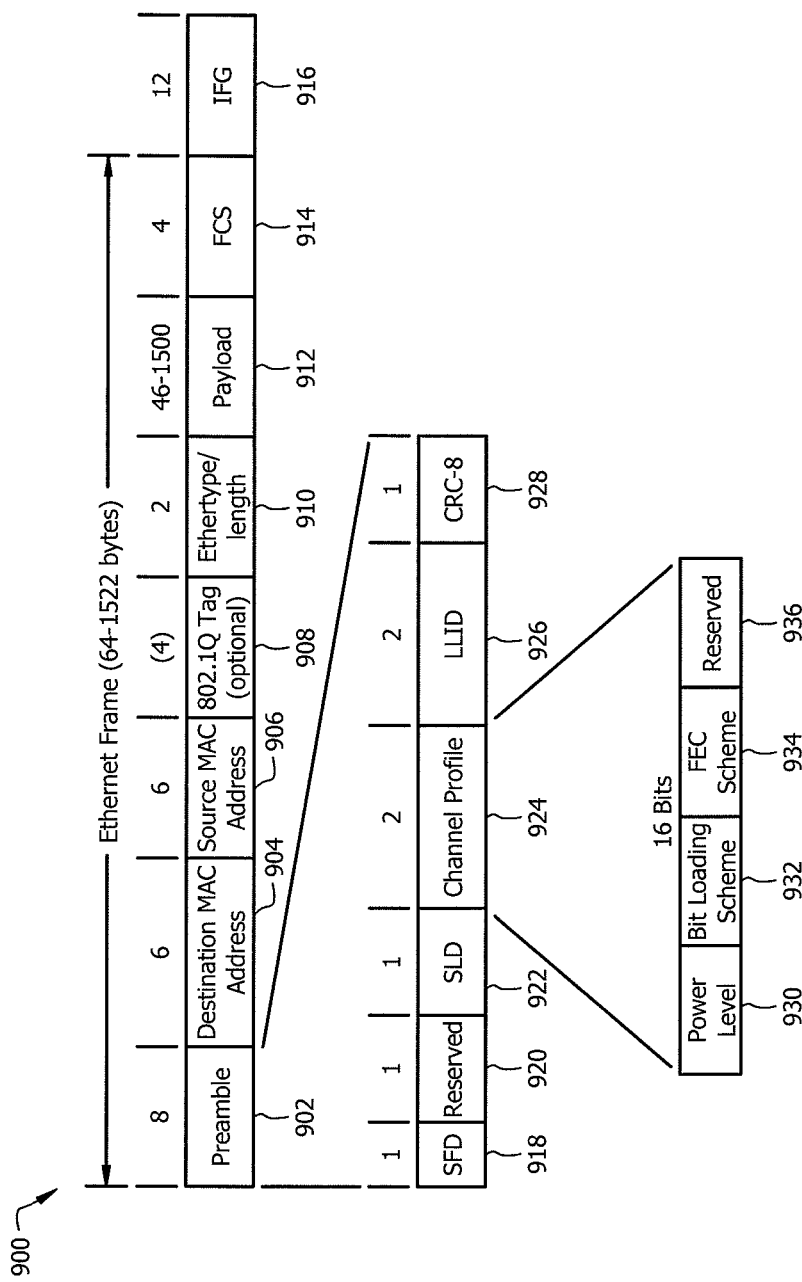
FIG. 9 is a schematic diagram of an Ethernet frame in accordance with another embodiment of the disclosure.

Additionally, in accordance with an embodiment of the disclosure, a GATE message may carry downstream segment channel parameters from an OLT to a CNU, e.g. in the unified optical-coaxial network 100 in FIG. 1. A schematic diagram of a GATE message which may carry downstream segment channel parameters is shown in FIG. 9 depicting an Ethernet frame 900 in accordance with the principles of the disclosure. Frame 900 begins with an 8-byte preamble 902. The remaining fields are a 6-byte destination and source MAC addresses (904 and 906, respectively), an optional 4-byte 802.1Q Tag 908, a 2-byte Ethertype/length 710, a payload 912, which may be between 46 and 1,500 bytes in length and a 4-byte FCS 714. An IFG 716 may be 12-bytes in length and may be positioned between successive Ethernet frames.

Preamble 902 may be further understood by referring to the "exploded" views in FIG. 9. The exploded view of preamble 902 may comprise six fields: an SFD 918; a reserved byte 920; a one-byte SLD 922; a channel profile 924, as described in conjunction with a further exploded view in FIG. 9; a two-byte LLID 926; and a one-byte CRC-8 928. An "exploded" view of Channel Profile 924 comprising 16-bits (two bytes) illustrates: a power level 930, a bit loading scheme 932, a forward error correction (FEC) scheme 934, and a reserved field 936 which may be used to carry other channel profile parameters.

The order of the fields in FIG. 9 is illustrative of an Ethernet frame in accordance with IEEE 802.3. However, the principles of the disclosure are not limited to a particular frame architecture and other predetermined message formats may be used therewith. Likewise, the respective lengths of the fields are similarly illustrative, and other predetermined field lengths in accordance with other message formats may be used in alternative embodiments, and such embodiments would lie within the spirit and scope of the claimed inventions.

Figure 10:
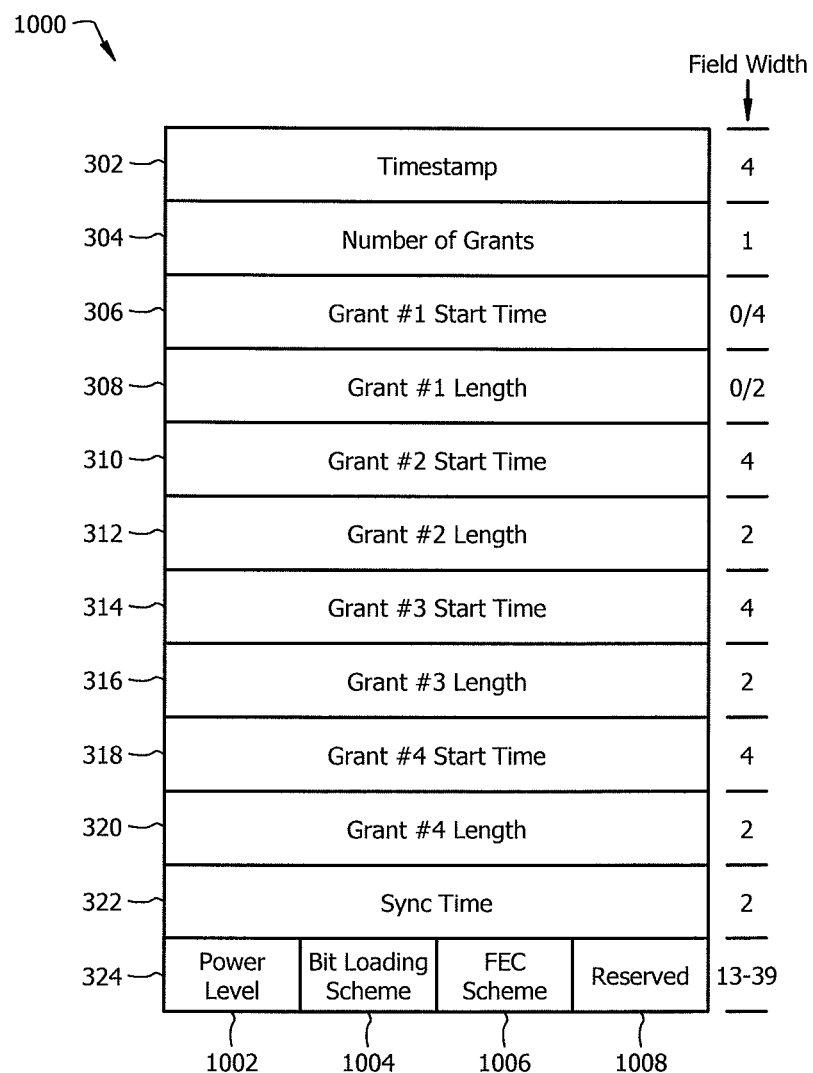
FIG. 10 is a schematic diagram of a portion of an Ethernet in accordance with another embodiment of the disclosure.

As described in conjunction with FIG. 3, downstream channel parameters may be embedded in a field of a GATE message allocated for padding or reserved bits. Refer now to FIG. 10 illustrating a portion of a GATE message 1000 that transmits channel parameters on a downstream portion of a unified optical-coaxial network in accordance with an embodiment of the disclosure. Fields 302-322 have been described hereinabove in conjunction with FIG. 3 and will not be described here.

Field 324, which in the embodiment of FIG. 3 is comprised of padding and/or reserved bits, is configured in gate message portion 1000 to carry channel profile data. Thus, in the illustrative example of FIG. 10, field 324 includes a portion 1002 which may be comprised of a channel power level, a portion 1004 which may be comprised of a bit loading scheme and a portion 1006 that may be comprised of an FEC scheme. Remaining bits 1008 may comprise reserve bits that may be used for padding, or alternatively, may carry additional channel profile data.

Figure 11:
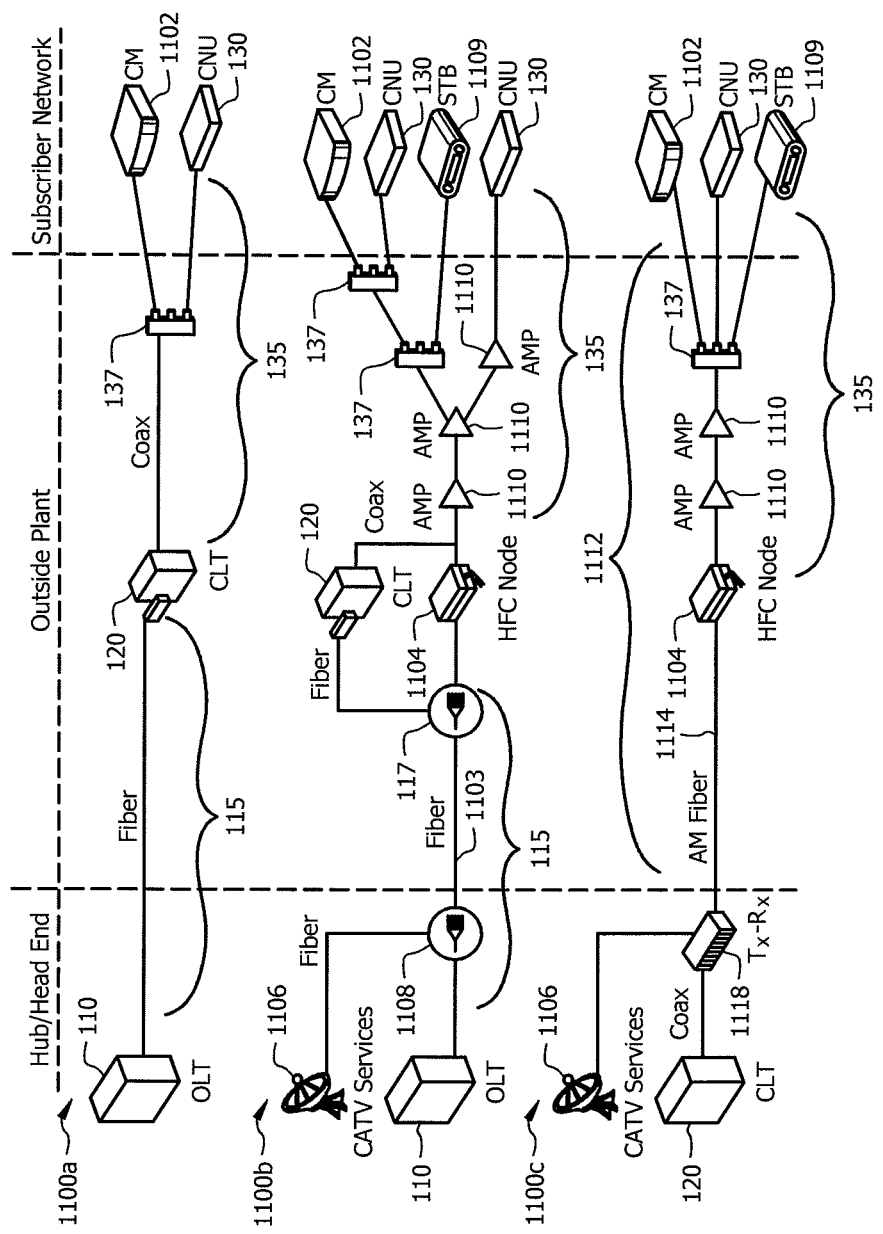
FIG. 11 is a schematic diagram of deployments of a unified optical-coaxial network in accordance with embodiments of the disclosure.

To further appreciate the unified optical-coaxial network 100, refer now to FIG. 11 illustrating unified optical-coaxial networks 1100a, 1100b, and 1100c representing various deployment environments in accordance with embodiments of the disclosure. Unified optical-coaxial network 1100a comprises an OLT 110 which may be located at a hub or head end facility coupled to CLT 120 via ODN 115. Each of OLT 110 and CLT 120 may comprise a processor and other logic (not shown) configured to manage and allocate upstream bandwidth in accordance with embodiments disclosed hereinabove. Further, CLT 120 may, for example, include a processor and other logic (not shown) configured buffer upstream traffic and forward the traffic to OLT 110 during a time window allocated by the OLT 110 as described in conjunction with embodiments disclosed above.

CLT 120 may be coupled to subscriber devices such as cable modem (CM) 1102 and CNU 130. It would be appreciated that subscriber devices CM 1102 and CNU 130 are provided by way of example, and other types of subscriber devices may be connected to CLT 120. As described in conjunction with FIG. 1, CNU 130 also may act as an intermediary between OLT 110 and subscriber devices such as a personal computer, television, set-top box and the like (not shown in FIG. 11). CLT 120 may be coupled to the CNU 130 and CM 1102 via EDN 135 which may comprise splitter 137. Further, in unified optical-coaxial network deployment 1100a EDN 135 may comprise passive coaxial cables.

Unified optical-coaxial network 1100b may comprise a unified optical-coaxial network deployment through amplifiers in conjunction with cable television (CATV) services 1106. In unified optical-coaxial network 1100b, OLT 110 is coupled to CLT 120 through ODN 115. ODN 115 may carry CATV services 1106 via multiplexer 1108, which multiplexes CATV signals onto fiber 1103. Additionally, multiplexer 1108 may multiplex signals from OLT 110 onto fiber 1103. CATV signals multiplexed onto fiber 1103 may comprise amplitude modulated (AM) analog signals, while signals from OLT 110 multiplexed onto fiber 1103 may comprise digital signals. ODN 115 may include a splitter 117 which may split the digital signals from OLT 110 and analog signals from CATV services 1106 on fiber 1103 and couples these signals to CLT 120 and hybrid fiber-coaxial (HFC) node 1104, respectively. Traditionally, HFC networks have been used to carry CATV services, but it would be appreciated that other services such as high-speed data services and telephony services may also be carried.

EDN 135 may couple signals from CLT 120 and HFC node 1104 to subscriber devices such as CNUs 130, CM 1102, and set-top box (STB) 1109. Again, CNUs 130, CM 1102, and STB 1109 are shown by way of example and it would be appreciated that other types of subscriber devices may be coupled to CLT 120. Electrical signals from CLT 120 and HFC node 1104 may comprise signals in distinct frequency bands and may be combined on EDN 135. For example, electrical signals from CLT 120 may comprise digital signals in a band of about 800 Megahertz (MHz) to about 1 Gigahertz (GHz) and electrical signals from HFC 1104 may comprise analog signals in a band from about 85 MHz to about 750 MHz. However, it would be understood by those skilled in the art that the aforementioned frequency bands are provided by way of illustration and the principles of the disclosure are not limited to these bands.

EDN 135 may further comprise splitters 137 and amplifiers 1110. Amplifiers 1110 may be included in EDN 135 to mitigate against attenuation of electrical signals carried thereon. It would be recognized by those skilled in the art that, in various embodiments, the number of amplifiers 1110 used may be different or an embodiment may not use any amplifiers 1110.

Unified optical-coaxial network 1100c comprises a unified optical-coaxial architecture in which a CLT 120 may be located in a hub/head end facility and digital signals form the CLT 120 overlay an HFC portion 1112 which provides an intermediate optical fiber link, optical fiber 1114. Digital electrical signals from CLT 120 may be amplitude modulated onto an optical signal by optical transceiver 1118. Video signals from CATV services 1106 may also be amplitude modulated onto the optical signal by transceiver 1118 and transmitted to HFC node 1104. HFC node 1104 may convert optical signals received on optical fiber 1114 to electrical signals for transmission via EDN 135 to subscriber devices such as CM 1102, CNU 130, and STB 1109. CM 1102, CNU 130, and STB 1109 again as provided in unified optical-coaxial network 1100c are by way of example and not intended to limit the disclosed embodiment to those types of devices, as would be understood by those skilled in the art. Electrical signals output by HFC node 1104 may comprise digital electrical signals arising from the aforementioned digital electrical signals from CLT 120, and analog electrical signals arising from CATV services 1106. As described in conjunction with unified optical-coaxial network 1100b, these respective electrical signals may comprise signals in distinct frequency bands.

Figure 12:
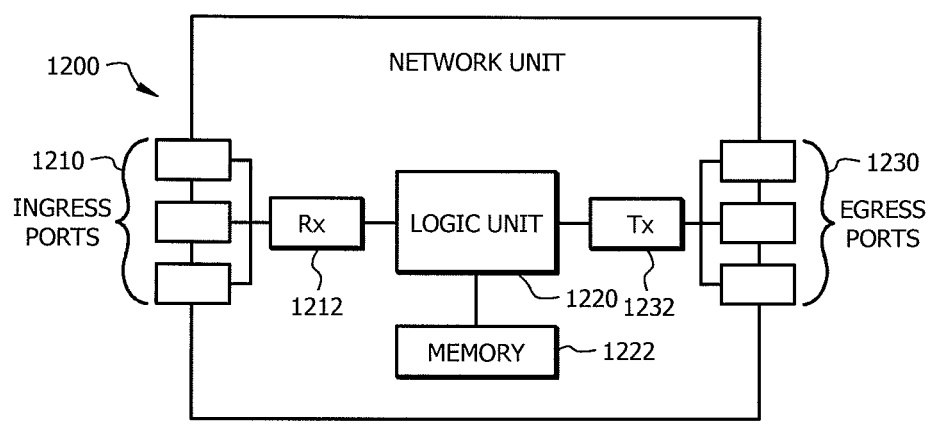
FIG. 12 is a block diagram of an embodiment of a network unit in accordance with embodiments of the disclosure.

At least some of the features/methods described in the disclosure may be implemented in a network apparatus or component, such as a network nodes or units described herein. For instance, the features/methods of the disclosure may be implemented using hardware, firmware, and/or software installed to run on hardware. The network apparatus/component or unit may be any device that transports frames through a network, e.g. an OLT, ONU, etc. FIG. 12 illustrates an embodiment of a transmitter/receiver unit 1200, in which the disclosed methods and systems may be implemented. The transmitter/receiver unit 1200 may be any device that transports data through the network. The network unit 1200 may comprise one or more ingress ports or units 1210 coupled to a receiver (Rx) 1212 for receiving signals and frames/data from other network components. The network unit 1200 may comprise a logic unit 1220 (e.g. MAC logic described above) to determine to which network components to send data. The logic unit 1220 may be implemented using hardware, software, firmware, or combinations thereof. Specifically, the logic unit 1220 may include a processor (which may be referred to as a central processor unit or CPU) that is in communication with memory devices 1222, including read only memory (ROM) and/or random access memory (RAM). The logic unit 1220 may be implemented as one or more general-purpose CPU chips running software stored in memory 1222, or may be part of one or more application specific integrated circuits (ASICs) and/or digital signal processors (DSPs). The network unit 1200 may also comprise one or more egress ports or units 1230 coupled to a transmitter (Tx) 1232 for transmitting signals and frames/data to the other network components. The components of the network unit 1200 may be arranged as shown in FIG. 12.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g. k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A coaxial network unit (CNU) comprising:
   a processor configured to:
      extract a grant start time from a message allocating a time window for upstream transmission of data;
      extract a grant length from the message allocating the time window for upstream transmission of data;
      map an integer portion of a value obtained from the grant start time into a symbol number of a data frame, wherein the value comprises the grant start time in units of a length of a data frame in a coaxial segment of a network, and wherein the length of the data frame comprises a preselected number of units of time defined in an optical segment of the network;
      map a fractional portion of the value obtained from the grant start time into a subcarrier number of the data frame; and
      map the grant length into a number of subcarriers of the data frame.

2. The CNU of claim 1, wherein the processor is further configured to send data for upstream transmission in a symbol corresponding to a mapped symbol number and load the data in a block of subcarriers comprising a plurality of subcarriers having a mapped number of subcarriers of the data frame and an initial subcarrier corresponding to a mapped subcarrier number.

3. The CNU of claim 1, wherein the data frame comprises an orthogonal frequency division multiplex (OFDM) frame.

4. The CNU of claim 1, wherein the message allocating the time window for upstream transmission of data comprises a multi-point control protocol (MPCP) GATE message.

5. The CNU of claim 2, wherein an orthogonal frequency-division multiplexing (OFDM) frame symbol number comprises the mapped symbol number.

6. The CNU of claim 2, wherein an orthogonal frequency-division multiplexing (OFDM) frame subcarrier number comprises the mapped subcarrier number.

7. The CNU of claim 1, wherein the processor is further configured to select the length of the data frame in units of time defined in the optical segment of the network.

8. An optical line terminal (OLT) comprising:
   a processor configured to:
      allocate a time window to a coaxial network unit (CNU), wherein the time window comprises a grant start time and a grant start length, and wherein the grant start time and grant start length comprise a number of quanta of time in an optical segment of a network;
      map an integer portion of a value obtained from the grant start time into a symbol number of a data frame in a coaxial segment of the network, wherein the value comprises the grant start time in units of a length of a data frame in the coaxial segment of the network, and wherein the length of the data frame comprises a preselected number of quanta of time in the optical segment of the network;
      map a fractional portion of the value obtained from the grant start time into a physical resource block (PRB) number of the data frame; and
      map the grant length into a number of PRBs of the data frame.

9. The OLT of claim 8, wherein the processor is further configured to embed a mapped symbol number, a mapped PRB number and a mapped number of PRBs in respective fields of a downstream message.

10. The OLT of claim 9, wherein the downstream message comprises an Ethernet frame.

11. The OLT of claim 8, wherein the processor is further configured to select the length of the data frame in units of time defined in the optical segment of the network.

12. The OLT of claim 9, wherein the processor is further configured to send a message including the time window to the CNU.

13. The OLT of claim 12, wherein the message comprises a Multi-Point Control Protocol (MPCP) GATE message.

14. A method of allocating upstream bandwidth on a network comprising:
   mapping an integer portion of a value obtained from a grant start time into a symbol number of a data frame on a coaxial segment of the network, wherein the value comprises the grant start time in units of a length of a data frame in the coaxial segment of the network, and wherein the length of the data frame comprises a preselected number of units of time defined in an optical segment of the network;
   mapping a fractional portion of the value obtained from the grant start time into a subcarrier number of the data frame; and
   mapping a grant length into a number subcarriers of the data frame.

15. The method of claim 14, further comprising embedding a mapped symbol number, a mapped physical resource block (PRB) number and a mapped number of PRBs in respective fields of a downstream message.

16. The method of claim 14, further comprising selecting the length of the data frame in units of time defined in the optical segment of the network.

17. The method of claim 14, further comprising sending data for upstream transmission in a symbol corresponding to a mapped symbol number and load the data in a block of subcarriers comprising a plurality of subcarriers having a mapped number of subcarriers of the data frame and an initial subcarrier corresponding to a mapped subcarrier number.

18. The method of claim 15 further comprising:
   embedding the time window in the downstream message; and
   sending the downstream message to a network device.

19. The method of claim 18, wherein the downstream message comprises a Multi-Point Control Protocol (MPCP) GATE message.

20. The method of claim 14, further comprising sending data for upstream transmission in a symbol corresponding to a mapped symbol number and load the data in a block of subcarriers comprising a plurality of subcarriers having a mapped number of subcarriers of the data frame and an initial subcarrier corresponding to a mapped subcarrier number.

* * * * *